Oct. 16, 1951     E. P. WHELAN ET AL     2,571,508

MACHINE FOR TIER PARKING MOTOR VEHICLES

Filed Sept. 1, 1948     3 Sheets-Sheet 1

INVENTORS
BENJAMIN N. ROSENBAUM
& EDWARD P. WHELAN
BY
Mawhinney & Mawhinney
Attorneys Oct. 16, 1951   E. P. WHELAN ET AL   2,571,508
MACHINE FOR TIER PARKING MOTOR VEHICLES
Filed Sept. 1, 1948   3 Sheets-Sheet 2
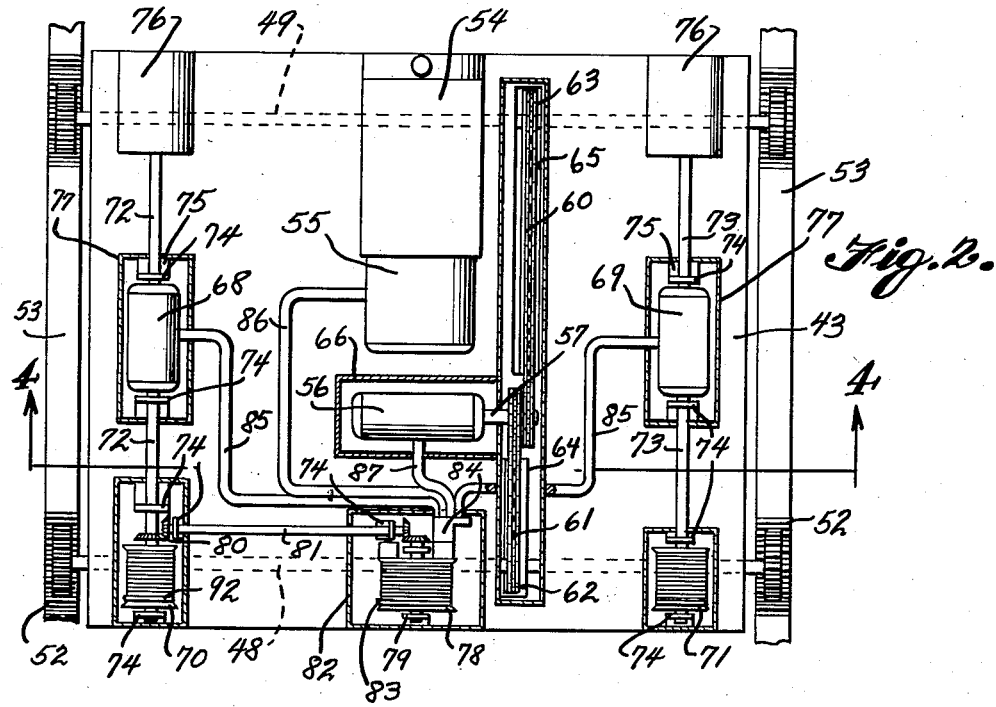
Fig. 2.
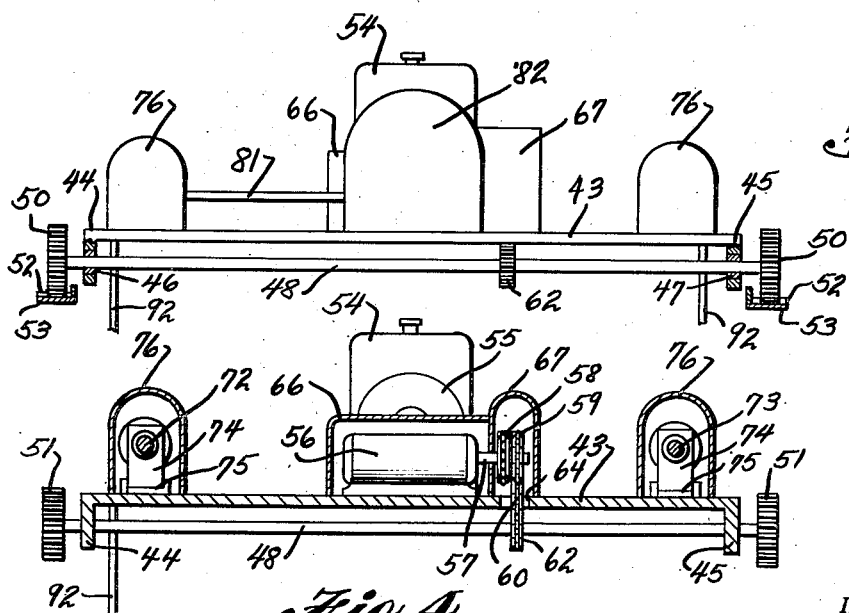
Fig. 3.
Fig. 4.
INVENTORS
BENJAMIN N. ROSENBAUM
& EDWARD P. WHELAN
BY
Mawhinney & Mawhinney
Attorneys Oct. 16, 1951   E. P. WHELAN ET AL   2,571,508
MACHINE FOR TIER PARKING MOTOR VEHICLES
Filed Sept. 1, 1948   3 Sheets-Sheet 3
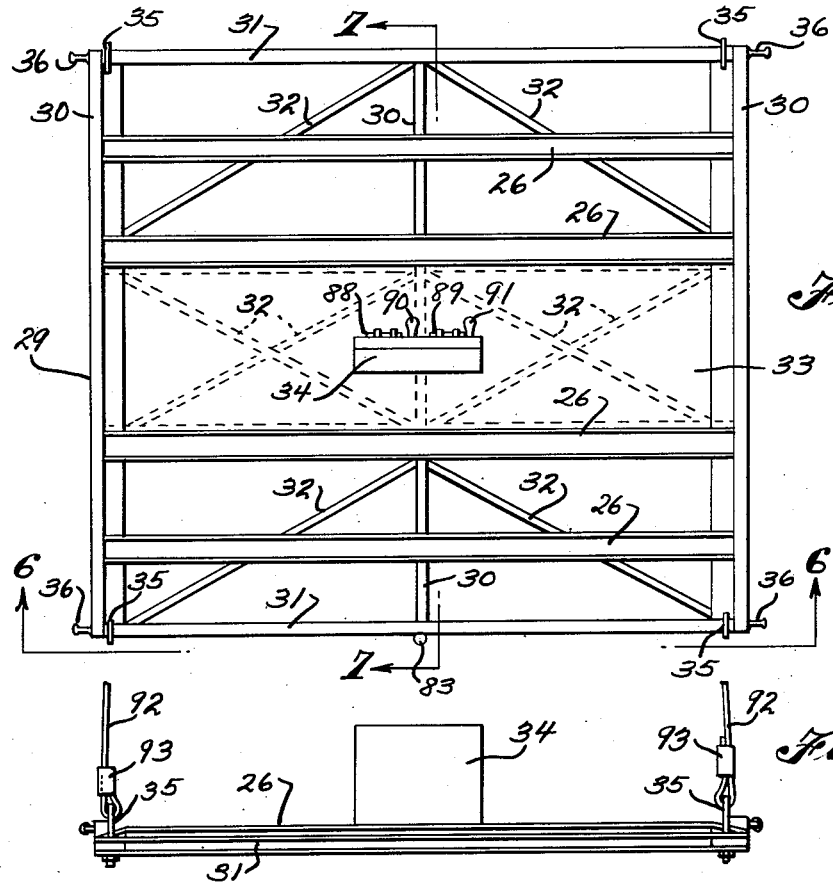
Fig.5.
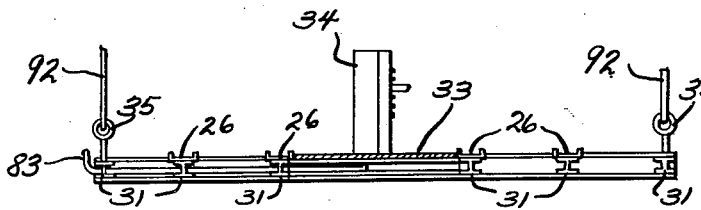
Fig.6.
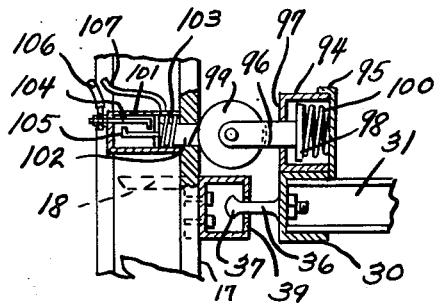
Fig.7.
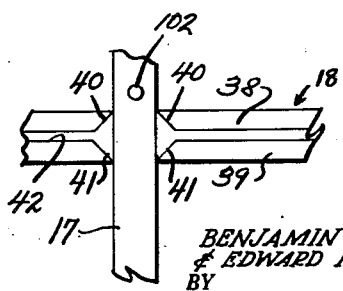
Fig.8.
Fig.9.
INVENTORS
BENJAMIN N. ROSENBAUM
& EDWARD P. WHELAN
BY
Mawhinney & Mawhinney
Attorneys Patented Oct. 16, 1951

2,571,508

UNITED STATES PATENT OFFICE 2,571,508

MACHINE FOR TIER PARKING MOTOR VEHICLES

Edward P. Whelan and Benjamin Newman Rosenbaum, Brooklyn, N. Y., assignors to Rosenbaum "Q-B-Kl" Parking Co., New York, N. Y., a corporation of Delaware Application September 1, 1948, Serial No. 47,264

2 Claims. (Cl. 214—16.1)

The present invention relates to improvements in a machine for tier parking motor vehicles and has for an object to provide a means for rapidly parking a large number of automobiles in an area heretofore only parking one-quarter to one-fifth the number contemplated by the present invention.

Another object of the present invention is to provide an open structure divided into compartments or cubicles each receiving one vehicle and which cubicles are disposed both vertically and horizontally of the lot.

Another object of the present invention is to provide a building structure and vehicle carrier means which permits the placing of a plurality of vehicles upon such structure and placing the same thence in the desired cubicles in a minimum of time.

A further object of the present invention is to provide a vehicle elevating device adapted to elevate a plurality of vehicles in a vertical direction and which straddles the open ends of two sets of cubicles and which is provided with driving means for driving the device horizontally along the line of cubicles and which may be more than one in number if desired. This driving or propelling structure and its cubicle support structure is to permit of economic original installation and require a minimum of maintenance and to be of such durable structure as to be operable in all elements.

A still further object of the present invention is to provide a structure to be placed on a parking lot, a pair of the lower cubicles of which form the entrance thereto. If parking is to be done for a short time such vehicles will be placed on the lower or ground level, however if it is the desire of the vehicle operator to leave the car for a longer period of time the same may be placed in a cubicle further removed from the entrance point proportional to the time estimated that the vehicle is to remain parked; for example, if the vehicle is to be parked all day the same may be placed in the top tier of cubicles and at the far end of the lot.

A still further object of the present invention resides in the provision of an elevating and traveling device for receiving vehicles at the ground level and rapidly and safely depositing such vehicles at any desired location in the cubicles, such device being constructed of light but strong material which will permit of economic and durable construction and efficient operation.

A still further object of the present invention is to provide a positive leveling means for the elevating device to properly align such device with any desired cubicle in the vertical tier arrangement such that a vehicle may be driven from the elevating device directly into the cubicle and to provide means to prevent the end to end sway of the elevating structure and to further eliminate to and fro swinging of the vehicle platform during the longitudinal or horizontal travel of the line of cubicles.

A still further object of the present invention is the provision of a vehicle elevating and traveling device which is automatic in operation and requires only one operator and thereby eliminates, due to its automatic operation, the element of possible human error in judging the alignment of the vehicle platform with the desired tier or cubicle prior to the removal of the vehicle therefrom and depositing the same in the cubicle.

The parking of vehicles has become a problem and a large number of municipalities have provided the system of public parking lots and even some have gone to the extent of providing a four-level parking area, each level of which may be reached only by the attendant driving the car up a sharply inclined bank and around sharp turns which has resulted in appreciable damage to a number of vehicles throughout the country due to the negligent operation of the attendants of such parking lots.

Applicants have studied extensively this problem and have evolved the foregoing system as more fully described hereinafter which will eliminate the necessity of placing the car in the hands of a possibly unskilled operator to drive and race the motor and over-exercise the brakes and gear transmission during the ascent and descent from sharply inclined areaways around sharp corners. Under the provisions of the present invention a plurality of both horizontal and vertically disposed cubicles are provided into which automobiles are deposited and retrieved by elevators which pick up the vehicle and elevate it to the desired tier level and carry it longitudinally and horizontally of the line of cubicles to the desired location of deposit and there eject the vehicle from the elevating device. This system has eliminated all of the poor judgment heretofore exercised by attendants in making sharp turns which resulted in damage to the exterior and sometimes interior of the vehicles.

The present invention contemplates only the driving of the vehicle onto the elevating platform and its backing off into the cubicle. Once the vehicle has been placed on the platform, the platform will be brought into exact alignment with the cubicle and the wheels need not be turned, merely the engine started and the vehicle backed or driven from the elevating platform.

Under many circumstances proposed heretofore only one car could be handled at a time and as a result during the rush hour large numbers of vehicles would accumulate in the streets in front of the parking area awaiting entrance to the same; however, under the present system two sets or lines of cubicles may be placed on one lot whereby two entrances would be employed, one on each side of the longitudinal dimension of the parking area and two of the elevating and traveling devices may be employed for each set of spaced cubicles which wil enable eight vehicles to be parked simultaneously on each side or a total of sixteen cars may be in the process of being parked at one time.

The invention according to applicants' device permits of a more efficient utilization of a given parking area inasmuch as the cubicles may be designed for the minimum parking clearances, including door opening space, of the largest pleasure vehicles and large areas of the lot need not be devoted to turning space for taking the vehicle from a position at right angles to the longitudinal dimension of the lot and swinging such vehicle around in a large sweeping arc to place it parallel to the longitudinal dimension of the lot as is necessary on present ground parking lots. In the present invention is to be employed in a small lot the elevating platform may be cut down, the width of which may be the length of only one vehicle rather than that of two which is shown in the accompanying drawings to thereby obtain a conservation of approximately twenty to twenty-five feet.

With the foregoing and other objects in view, the invention will be more fully described hereinafter, and will be more particularly pointed out in the claims appended hereto.

In the drawings wherein like symbols refer to like or corresponding parts throughout the several views, Figure 1A is a vertical longitudinal section taken on the line 1A—1A in Figure 1B and showing a plurality of vertical and horizontally spaced cubicles adapted to receive a vehicle therein.

Figure 2 is a top plan view of an improved form of elevating and traveling device employed in accordance with the present invention.

Figure 3 is an end elevational view of the form of elevating and traveling device shown in Figure 2.

Figure 4 is a vertical transverse section of the improved elevating and traveling device taken on the line 4—4 in Figure 2.

Figure 5 is a top plan view of a form of vehicle loading platform employed in connection with the elevating and traveling device.

Figure 6 is a side elevational view taken on the line 6—6 in Fig. 5 of the vehicle loading platform.

Figure 7 is a vertical transverse section of the vehicle loading platform taken on the line 7—7 in Figure 5.

Figure 8 is a fragmentary side elevational view with parts broken away and parts shown in section of the loading platforms automatic leveling and sway eliminating device.

Figure 9 is a fragmentary front elevation of a section of the cubicle structure showing the flanged guiding device to eliminate to and fro sway of the vehicle loading platform during its travel along the line of cubicles.

Figure 1A:
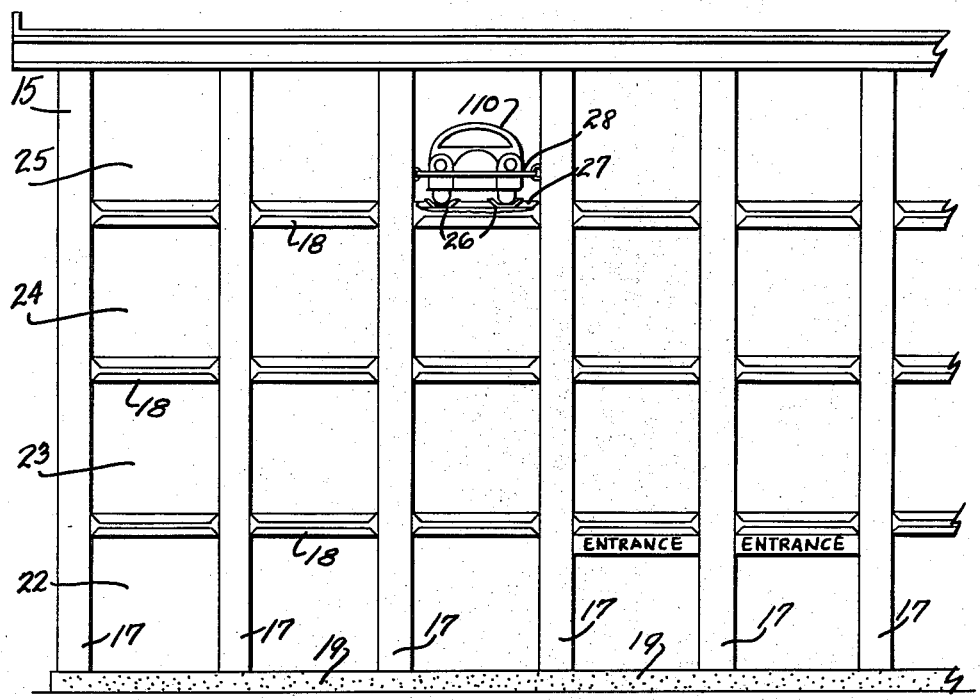
Figure 1B is a side elevational view with parts broken away showing two lines of horizontally and vertically spaced cubicles having vehicles deposited therein and showing the elevating and traveling device stradding the two lines of cubicles, such elevating device having two vehicles thereon in preparation for deposit in any desired cubicle.
Figure 1B:
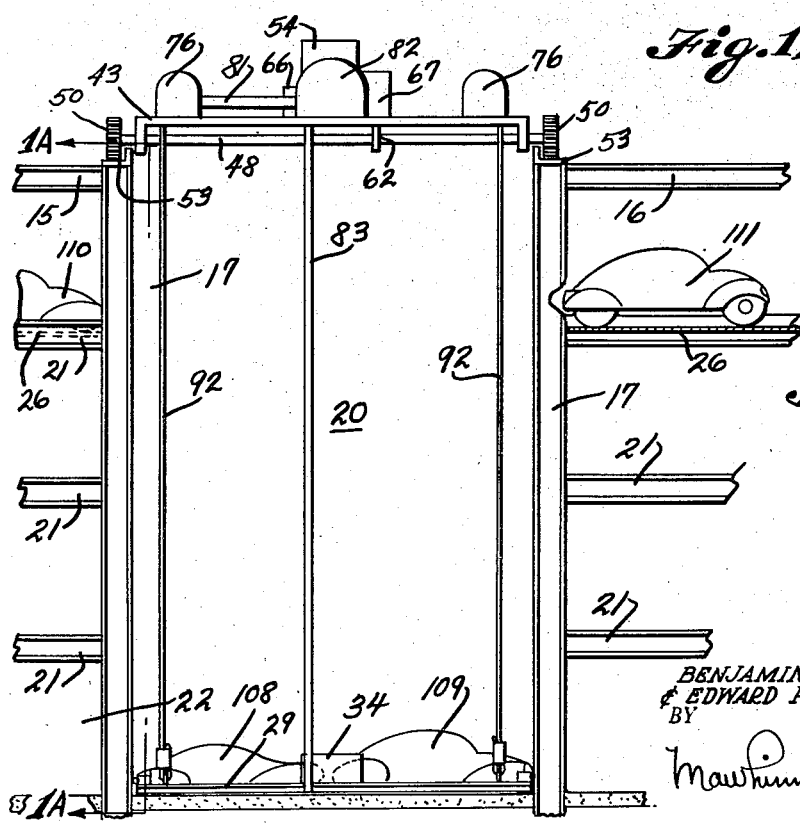

Referring more particularly to Figures 1A and 1B of the drawings, we have shown a series of open work structures at 15 and 16. While we have shown only two such structures it will be appreciated that in accordance with the present invention an additional set similar to the set shown in Figure 1B may be placed adjacent to either the left-hand or right-hand end of Figure 1B. Each open work structure is of the multi-story type and is constructed in each instance from vertical risers 17 which may be of the appropriate calculated I-beam construction, between which are positioned vertically spaced apart horizontal girders 18. The columns might be embedded in a concrete floor 19 or on conventional piers (not shown). Between the structures 15 and 16 there is provided an aisle or areaway 20. Each structure has a ground level with compartments or cubicles arranged thereabove. Appropriate girders in the form of I-beams or the like 21 define the depth of each cubicle. Referring to the structure 15, it will be noted that there is provided a cubicle 22 at the ground level and immediately thereabove and vertically aligned therewith are cubicles 23, 24 and 25. It will be noted that for purposes of illustration of one embodiment of the present invention we have shown in addition to the ground level parking space cubicles for housing three more vehicles in separate cubicles vertically above the one at the ground level. This construction will permit the parking of three hundred and twenty cars on a lot 200' x 160' which now would normally park approximately one hundred and twenty cars. The foregoing figures were arrived at on the basis of the following, that the depth or length of each cubicle would be twenty feet and that the width of the average automobile is approximately six feet and that a distance of ten feet is allowed from the center of the vertical riser 17 to the center line of the horizontally spaced apart adjacent vertical riser 17. The reasonable height of each cubicle might be computed as that of seven feet and the approximate height of the structures 15 and 16 as illustrated would be thirty-two feet. It will readily be appreciated that where it is impossible to expand outwardly on existing lots by going up a far greater number of cars might be accommodated. While we have shown four tiers of cars, we desire it to be understood that in connection with the present invention any number of tiers might be employed; for example, seven or eight tiers or even more would be possible under this system thereby increasing the capacity of a given lot. It will be readily appreciated that the compaction of the earth on a given lot will determine the height of the structure. While we have shown the cubicles or structures to be open walled, it will be apparent that the same may be enclosed about its exterior surface to protect the automobiles parked therein from the elements, such as severe rain, hail and snow storms.

The base of each cubicle will be composed of two skids 26 for receiving the wheels of the vehicle and a side plate 27 to permit the vehicle carrier operator to drive a car into a cubicle, open the door and leave the vehicle and return to the vehicle receiving platform.

According to the present invention the ground level cubicles would be employed for in and out or short time parking cars and the upper cubicles would be used for all day or longer parking.

In order to prevent the rolling of a car, once placed in a cubicle out of such cubicle due to the possible fortuitous release of the brakes, a guard cable 28 is provided across the front of each cubicle.

Referring more particularly to Figures 5 through 7 inclusive, it will be noted that the vehicle receiving platform 29 is shown as consisting of pairs of horizontally spaced apart skids carried upon a frame consisting of longitudinal channels 30 and transverse I-beams 31. These transverse I-beams are disposed one at each end of the frame and one beneath each of the skids 26. Suitable cross-bracing in the form of angle irons 32 are employed throughout the structure as best seen in Figure 5. An operating platform 33 is provided over the framework between the pairs of skids upon which is carried the operating switch board 34. Suitably attached at four various points about the frame are receiving eyes 35 for receiving cables as will be more fully set forth hereinafter. The frame carries at opposite ends of each side thereof projecting guides 36 having enlarged raised heads 37 as best seen in Figure 8. The projecting guides are adapted to be received between depending flanges 38 and 39 of channel iron forming a part of the horizontal girders 18 for reasons set forth more fully hereinafter. The depending flanges 38 and 39 have flared mouth portions 40 and 41 for receiving and guiding the guide 36 carried by the vehicle receiving platform 29 into the slot 42 formed by the flanges thereby prohibiting to and fro swaying of the vehicle platform during its horizontal travel along the line of cubicles which would normally tend to take place because of the pendulous weight of the platform and its suspension by cables as will be more fully set forth hereinafter.

Referring more particularly to Figures 2 through 4 inclusive, a vehicular platform 43 is shown having downwardly depending end walls 44 and 45. These end walls 44 and 45 receive annular bearings 46 and 47 for rotatably receiving and supporting drive shafts 48 and 49 which have affixed at their outer extremities wheels 50 having gear teeth 51 about their periphery. The teeth 51 are adapted to mesh with upstanding teeth 52 of a gear rack 53 carried by the upper tier of cubicles at the open end thereof and such gear racks are provided along the top line of cubicles at the open end of adjacent spaced apart rows of cubicles. A gasoline or diesel engine 54 having an electric generator 55 coupled thereto is secured to the vehicular platform 43. The electric generator 55 supplies the vehicular platpower to rotate its drive shaft 57 through operform propelling motor 56 with the necessary ating switch board 34 thereby imparting rotation to sprocket gears 58 and 59 which drive chains 60 and 61 for imparting rotation to pinion gears 62 and 63 which are rigidly secured on drive shafts 48 and 49 respectively to cause rotation of the wheels 50 and propel the vehicular platform 43 along the gear rack 53 on top of the structure 15 and 16. Slots 64 and 65 are provided in the platform 43 to permit communication of the pinion gears 62 and 63 with the sprocket gears 58 and 59 via chains 60 and 61. A suitable weatherproof housing 66 is provided to protect the electric motor 56 from the elements and has a curved top surface to permit rain to readily slide off the same and not accumulate on the top thereof. Also a suitable protective housing 67 is provided over the chain drive to protect workmen on the platform 43 from becoming fouled in the drive and to also protect the chain against deterioration from continuous exposure to the elements.

At opposite sides of the vehicular platform 43 are carried windlass motors 68 and 69 for driving windlasses 70 and 71. These windlasses are four in number and are placed in pairs, one on each side of the windlass motors 68 and 69 and are driven by the motors 68 through drive shafts 72 and 73 which may be suitably connected to or integral with the armature of the motor. The shafts 72 and 73 are rotatably journaled in shaft supports 74 which may be of any suitable number desired to properly carry the weight of the shaft employed. These supports are preferably of the L-shape having a base or foot 75 which may be bolted or otherwise secured to the vehicle platform 43. Suitable curved top weatherproof housings 76 are provided for the windlasses and a similarly designed housing 77 for the windlass motors. It will be noted that electric motors 68 and 69 must be synchronized to rotate the windlasses driven thereby in unison in order that one pair will not wind in their cables faster than the other. A control cable windlass 78 is similarly mounted on the platform 43 as by L-shaped brackets 79 and receives its rotation from one of the windlass drive shafts 72 by a bevel gear drive 80 which is transmitted to the control cable windlass 78 via a shaft 81. Likewise a suitable weatherproof housing 82 is provided for the control cable windlass 78. A suitable multi-conductor control cable 83 is carried upon the control cable windlass 78 one end of which communicates with the operating switch board 34 and the other end of which through the conventional slip rings and brush arrangement 84 communicates with motors 68 and 69 and engine 54, it generator 55 and drive motor 56 in communication therewith through cables 85, 86 and 87 respectively.

Referring more particularly to Figures 5 through 7 inclusive, it will be noted that the control cable 83 enters the operating switch board 34 at the base thereof and that two separate button panels 88 and 89 are provided with operating levers 90 and 91 respectively. The panel 88 is provided with selectomatic buttons which may be pressed by the operator to predetermine the tier level at which the vehicle receiving platform 29 is to stop to discharge the vehicles therefrom and such vertical elevating motion is commenced by the arcuate movement of the operating lever 90. The horizontal travel of the vehicle platform 43 to cause the vehicle receiving platform 29 to be drawn horizontally along the predetermined tier of cubicles is controlled by push button panel 89 on the operating switch board 34 which predetermines the horizontal distance that the platform is to travel and such motion is commenced by the arcuate movement of operating lever 91.

Suitable flexible cables 92 being four in number have one of their ends secured to the windlasses 70 and 71 whilst their other end is passed through cable receiving eyes 35 secured to the vehicle receiving platform 29 and such cable is brought back upon itself and rigidly secured by means of clamps 93 or any other suitable means.

Referring more particularly to Figures 8 and 9 a form of automatic leveling and sway eliminating device is shown wherein a cylinder 94 is secured to the end channel 30 of the vehicle receiving platform and has an end wall 95. A bifurcated plunger 96 is receivable through the front wall 97 of the cylinder 94 and such plunger has a head 98 thereon. A roller 99 of any suitable dimension not in excess of the width of the vertical riser 17 is carried by the bifurcated plunger 96. A large coil spring 100 is placed between the plunger head 98 and the end wall 95 to urge the roller 99 against the flat surface of the vertical riser 17. The coil spring may be selected of any resilient material giving the desired amount of compression and expansion to assure positive engagement of the roller with the flat surface of the vertical riser 17 in order to eliminate end to end sway of the vertical receiving platform 29 during its vertical elevation.

A normally closed switch 101 in the armature circuit of the windlass motors is provided having a plunger 102 biased to a normally outward position by a spring 103 and having contact members 104 and 105. The switch is connected in the armature circuit by conductors 106 and 107. A plurality of these switches is provided at each tier level of cubicles and the same are placed in the vertical risers 17 such that the plunger 102 projects outwardly therefrom in such a way that it will be contacted by the roller 99 and urged inwardly upon upward movement of the roller 99 to open the contacts 104 and 105 in the armature circuit thereby stopping the hoisting operation of the windlass motors 68 and 69.

The normally closed switches 101 may be selectively cut in or out of the armature circuits of the windlass motors from the operating switch board 34 in any known manner in such a way that the vehicle receiving platform 29 will not automatically stop at the second tier of cubicles if it is the desire of the operator to ascend to the fourth tier.

In operation the system functions as follows.

Automobiles 108 and 109 to be placed in diverse cubicles in tiers above the ground level are driven on the vehicle receiving platform 29. It will be noted that as many as four vehicles may be driven onto the vehicle receiving platform 29 at one time. The elevator operator will first select the desired tier that the vehicles are to be deposited in by selecting the appropriate button on the panel 88 of the operating switch board 34 and once having selected the button he will move the operating lever 90 in a direction to cause the windlass motors 68 and 69 to drive the windlasses 74, thereby winding upon the windlasses the desired amount of cable 92 elevating the vehicle receiving platform 29 to the desired tier level. As the vehicle receiving platform approaches the desired tier level the roller 99 of the leveling and sway eliminating device will contact the plunger 102 of the normally closed switch 101 which will thereby open the armature circuit of the windlass motors 68 and 69 thereby stopping the winding of the cable 92 upon the windlasses 74.

The operator will then select the desired horizontal cubicle at the predetermined tier level and press the appropriate button on panel 89 and then by moving the operating lever 91 in the appropriate direction will cause the propelling motor 56 to be energized and drive the vehicular platform 43 along the gear rack 53 along the top of the two spaced apart cubicle structures 15 and 16 as best seen in Figure 1B. If desired a horizontal aligning device similar to the vertical aligning device described heretofore and illustrated in Figure 8 of the drawings may be employed to open the armature circuit of the propelling motor 56 when the skids 26 of the vehicle receiving platform 29 come into horizontal alignment with the skids 26 of the desired cubicle. When the vehicle receiving platform 29 has come to rest and the skids 26 of the platform 29 are vertically and horizontally aligned with the skids 26 in the desired cubicle, the operator of the vehicle receiving platform will back the vehicle 108 from the vehicle receiving platform into the desired cubicle while his assistant drives the vehicle 109 forwardly into the horizontally and vertically aligned but spaced apart row of cubicles. Upon the deposit of the vehicles in the desired cubicles the platform operator will leave the vehicle as the vehicle, for instance as shown at 110 in Figure 1A, by the side plate or walkway 27 and return to the vehicle receiving platform and then select another cubicle for the deposit of the remaining two vehicles. This may be at the same tier level or at a different tier level from the above selected cubicle. If it is at the same level the operator merely selects the desired cubicle and presses the appropriate button on the panel 89 and moves the lever 91 in the desired direction which will electrically connect the propelling motor 56 with the generator 55 through operating switch board 34 and cause the propelling platform 43 to be driven along its trackway 53 until the desired cubicle is reached and proper alignment with the platform attained, at which time the third and fourth automobile or the third or fourth automobile separately may be driven from the vehicle loading platform 29 into the desired cubicle.

Upon the deposit of all vehicles in their desired cubicles the operator will return the vehicle receiving platform 29 to its original loading station at which time another load of four or less vehicles might be parked.

The vehicle receiving platform 29 is prohibited from tipping or cocking due to a possible uneven load or weighting, for instance as when one or two vehicles have been removed from the platform, by the guides 36 which are resting within the slots 42 of the flanges 38 and 39 as best seen in Figure 8. The material of which the guide 36 is made may be selected to possess the desired sheer strength.

It will be appreciated that the central ground level cubicles would be employed as the entrance to the parking area in order that where a large number of horizontal vertically tiered cubicles are employed, two loading platforms identical to that shown in Figure 1B might be employed in such a manner that as many as eight cars could be in the process of being parked simultaneously. It is further contemplated according to the present invention that as many lines of cubicle structures 15 and 16 may be employed on a given lot as the area permits; for instance a second arrangement similar to that shown in Figure 1B might be arranged with a second structure similar to that designated as 15 in Figure 1B might have the rear of its cubicles abutting the rear of the cubicles in the structure designated as 16 and a similar structure to that shown in Figure 1B constructed parallel to the areaway 20 but spaced therefrom by the length of two cubicles and that in such further extension two vehicle loading platforms might be employed similar to that in Figure 1B and an entrance similar to that shown in Figure 1A employed on the far side of the lot in order that upwards to sixteen cars might be in the process of being parked at one time.

It will readily be appreciated that in accordance with our invention that a more effective utilization of a parking area might be had with an increased safety to the vehicles involved in that as stated hereinbefore there are no steep inclines or sharp corners to be turned by the attendants of the parking area in the process of parking the vehicle and also that an additional saving in time during peak periods or rush hours might be had in the retrieving of the vehicles from the cubicles wherein they reside. The retrieving procedure from the entrance point will be identical to that of the deposit with the exception that the vehicle receiving platform operator will drive the vehicles from the cubicles onto the loading platform.

While we have shown the vehicle loading platform capable of carrying four automobiles, we wish it understood that such platform might be constructed to carry only two automobiles, one beside the other, for use on lots having a very small parking surface area.

Although I have disclosed herein the best form of the invention known to me at this time, I reserve the right to all such modifications and changes as may come within the scope of the following claims.

What is claimed is:

1. In a system for tier parking automobiles a plurality of spaced apart vertical risers, vertically spaced apart horizontal girders forming with said vertical risers a plurality of horizontally and vertically aligned cubicles each cubicle of which is adapted to receive an automobile, a vehicle receiving platform movable both horizontally and vertically between the open ends of adjacent spaced apart rows of cubicles, a vehicular frame having wheels thereon with teeth about their periphery, tractive means carried by the top of the uppermost cubicle for the entire length of the tier along the open ends thereof adapted to be engaged by the teeth on the wheels of said vehicular frame, windlass means carried at opposite ends of said vehicular frame for raising and lowering said vehicle receiving platform, flexible connecting means between said windlass means and said vehicle receiving platform for elevating and suspending said vehicle receiving platform, said horizontal girders have depending flanges therefrom forming a mouth for receiving a guide carried by said vehicle receiving platform to eliminate to and fro swinging of said vehicle receiving platform while such platform is traveling horizontally along a predetermined tier of cubicles.

2. In a system for tier parking automobiles a plurality of spaced apart vertical risers, vertically spaced apart horizontal girders forming with said vertical risers a plurality of horizontally and vertically aligned cubicles each cubicle of which is adapted to receive an automobile, a vehicle receiving platform movable both horizontally and vertically between the open ends of adjacent spaced apart rows of cubicles, a vehicular frame having wheels thereon with teeth about their periphery, tractive means carried by the top of the uppermost cubicle for the entire length of the tier along the open ends thereof adapted to be engaged by the teeth on the wheels of said vehicular frame, windlass means carried at opposite ends of said vehicular frame for raising and lowering said vehicle receiving platform, flexible connecting means between said windlass means and said vehicle receiving platform for elevating and suspending said vehicle receiving platform, said horizontal girders have depending flanges therefrom having a flared mouth proximate the vertical risers converging horizontally to form a guide slot for receiving a guide carried by said vehicle receiving platform to eliminate to and fro swinging of said vehicle receiving platform while said platform is being driven horizontally along a predetermined tier of cubicles.

EDWARD P. WHELAN.
BENJAMIN NEWMAN ROSENBAUM.

REFERENCES CITED

The following references are of record in the file of this patent:

UNITED STATES PATENTS

| Number | Name | Date |
| --- | --- | --- |
| 1,003,566 | Winters | Sept. 19, 1911 |
| 1,288,567 | Hall | Dec. 24, 1918 |
| 1,460,569 | Brodesser | July 3, 1923 |
| 1,757,331 | Porter | May 6, 1930 |
| 1,872,803 | Persson | Aug. 23, 1932 |
| 1,990,363 | Baldwin | Feb. 5, 1935 |